United States Patent [19]
Whiting

[11] Patent Number: 5,196,826
[45] Date of Patent: Mar. 23, 1993

[54] SENSOR FOR DETECTING THE PASSAGE OF A PERSON OR AN ANIMAL IN A FIELD OF VIEW

[75] Inventor: Gordon S. Whiting, Orangevale, Calif.

[73] Assignee: C & K Systems, Inc., Folsom, Calif.

[21] Appl. No.: 721,142

[22] Filed: Jun. 26, 1991

[51] Int. Cl.⁵ .................. G08B 13/18; G08B 21/00
[52] U.S. Cl. ............................. 340/554; 49/25; 49/26; 49/31; 340/521; 342/28; 342/61
[58] Field of Search ............... 340/554, 522, 521; 49/25, 26, 31; 342/28, 61

[56] References Cited

U.S. PATENT DOCUMENTS

| | | | |
|---|---|---|---|
| 4,009,476 | 2/1977 | Lutz | 49/31 |
| 4,577,437 | 3/1986 | Gionet et al. | 49/25 |
| 4,625,199 | 11/1986 | Pantus | 340/554 |
| 4,882,567 | 11/1989 | Johnson | 340/554 |
| 4,967,083 | 10/1990 | Kornbrekke et al. | 49/25 |

*Primary Examiner*—Glen R. Swann, III
*Attorney, Agent, or Firm*—Limbach & Limbach

[57] ABSTRACT

Both a motion detector and a presence detector receive doppler shifted reflected microwave radiation to detect the passage of a person or an animal in a field of view. The motion sensor is adapted to detect the passage of a person or an animal near a doorway and to actuate the doorway in response thereto, to permit the passage of the person or animal thereto. The presence detector detects "swaying motion" of a person or an animal in a field of view much closer to the location of the sensor as its gain is much lower than that of the motion detection channel. In addition the presence detector is activated only in the event the motion sensor is deactivated. The output signals from the motion sensor and presence sensor are gated through an OR gate and to a timer to activate the door opener.

8 Claims, 5 Drawing Sheets

SENSOR FOR DETECTING THE PASSAGE OF A PERSON OR AN ANIMAL IN A FIELD OF VIEW

TECHNICAL FIELD

The present invention relates to a sensor for detecting the passage of a person or an animal in a field of view, and more particularly, to a sensor which is adapted to detect the passage of a person or an animal near a doorway and to actuate the door in response thereto, to permit the passage of the person or animal therethrough.

BACKGROUND OF THE INVENTION

Sensors used with automatic door openers to sense the motion of a person or an animal in a field of view are well known in the art. These sensors typically use microwave transceivers to detect motion. Microwave detectors sense the doppler shift of the reflected microwave signal from a moving target to detect motion. Other motion sensors include passive infrared detectors.

Of the two types of sensing technology, passive infrared detectors and microwave detectors, passive infrared detectors are smaller and less complicated. Thus, they are less expensive than microwave detectors. However, passive infrared detectors are subject to noise near ambient body temperature. In addition, these sensors are sensitive to sunlight.

In contrast, microwave detectors are more immune to temperature variations and other environmental conditions such as sunlight and drift. The problem with motion detectors which actuate the opening of doors is that the sensors do not detect the presence of an individual—only the motion of an individual. Thus, for example, if a person stops while moving towards the threshold of an automatic door, the microwave detector would stop detecting the motion and hence would conclude that the person has crossed the threshold of the automatic door. The door would then be closed, posing a safety problem. The individual may be knocked down by the closing of the door if the individual is directly in the path of the threshold of the doorway or may be frightened by the closing of the door.

To overcome the problem of a person stopping near the threshold of the door, active infrared detectors have been used in combination with microwave detectors. The active infrared detector is positioned near the threshold of the doorway. The active infrared detector, emits infrared radiation which is received by a sensor placed at the opposite location of the doorway threshold. The presence of a person in that position blocking the infrared radiation would cause the active infrared detector to sense the presence of the individual.

Long delays are added to motion detectors before the doors are closed because the motion detector cannot detect when a person is near the threshold of a doorway. This condition occurs when an elderly or a slowly moving person requires more time to cross the doorway threshold. Since the active infrared detector, even if used with a microwave detector, is always positioned across the threshold of a doorway, the active infrared detector has a narrow field of view. The result is that delays are added to keep the doors open longer irrespective of the pace of the person or animal to prevent mishaps. The maintainence of the door in an open position unnecessarily creates energy loss from within the building to the external environment.

SUMMARY OF THE INVENTION

Accordingly, an improved sensor for detecting the passage of a person or an animal in a field of view is disclosed. The sensor has means for detecting the motion of the person or the animal in the field of view. The detecting means generates a first signal in response to the detection of the motion of the person or animal in the field of view. A sensing means detects the presence of the person or animal in a portion of the field of view. The sensing means generates a second signal in response. The sensing means is activated in response to the first signal. Logic means receives the first and second signals and generates an actuation signal to indicate the passage of the person or animal through the field of view.

DETAILED DESCRIPTION OF THE DRAWINGS

Figure 1:
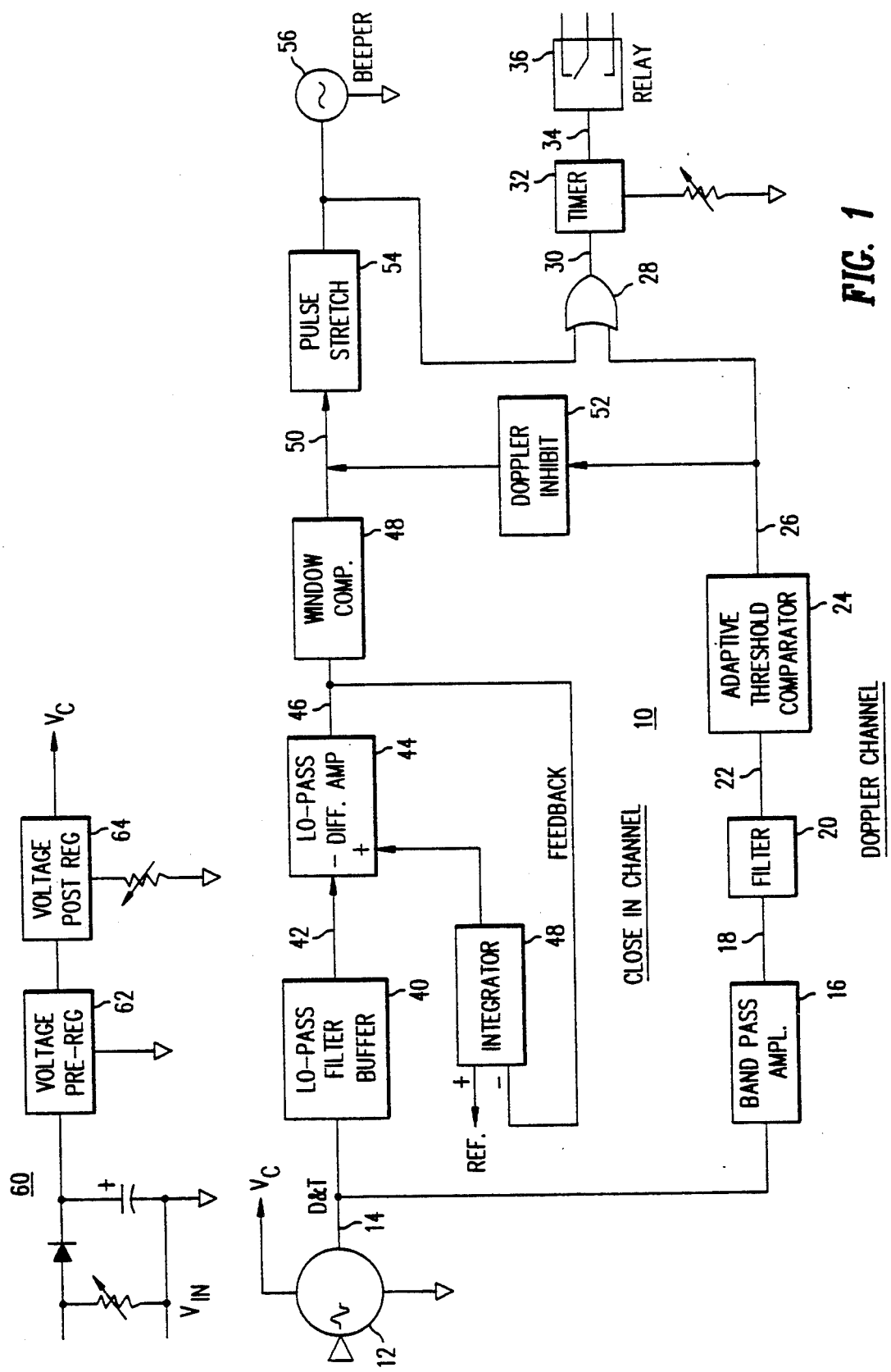
FIG. 1 is a schematic block level diagram of the sensor the present invention and of a voltage supply which is used to supply a source of low voltage, direct current to the various components of the sensor of the present invention.
Figure 2A:
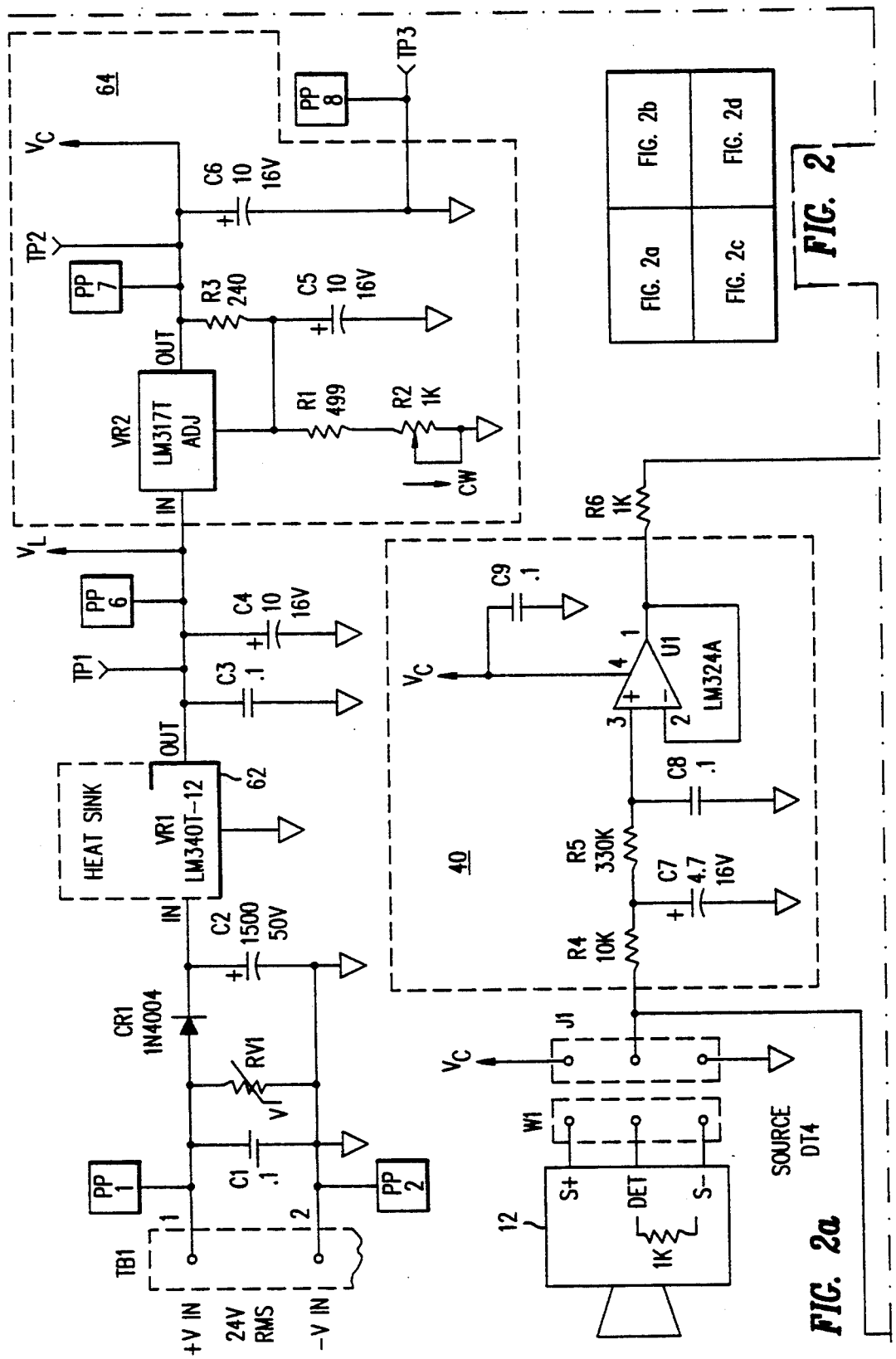
FIG. 2a–2d comprise a detailed circuit diagram of the sensor of the present invention and of the voltage supply, shown in FIG. 1.
Figure 2B:
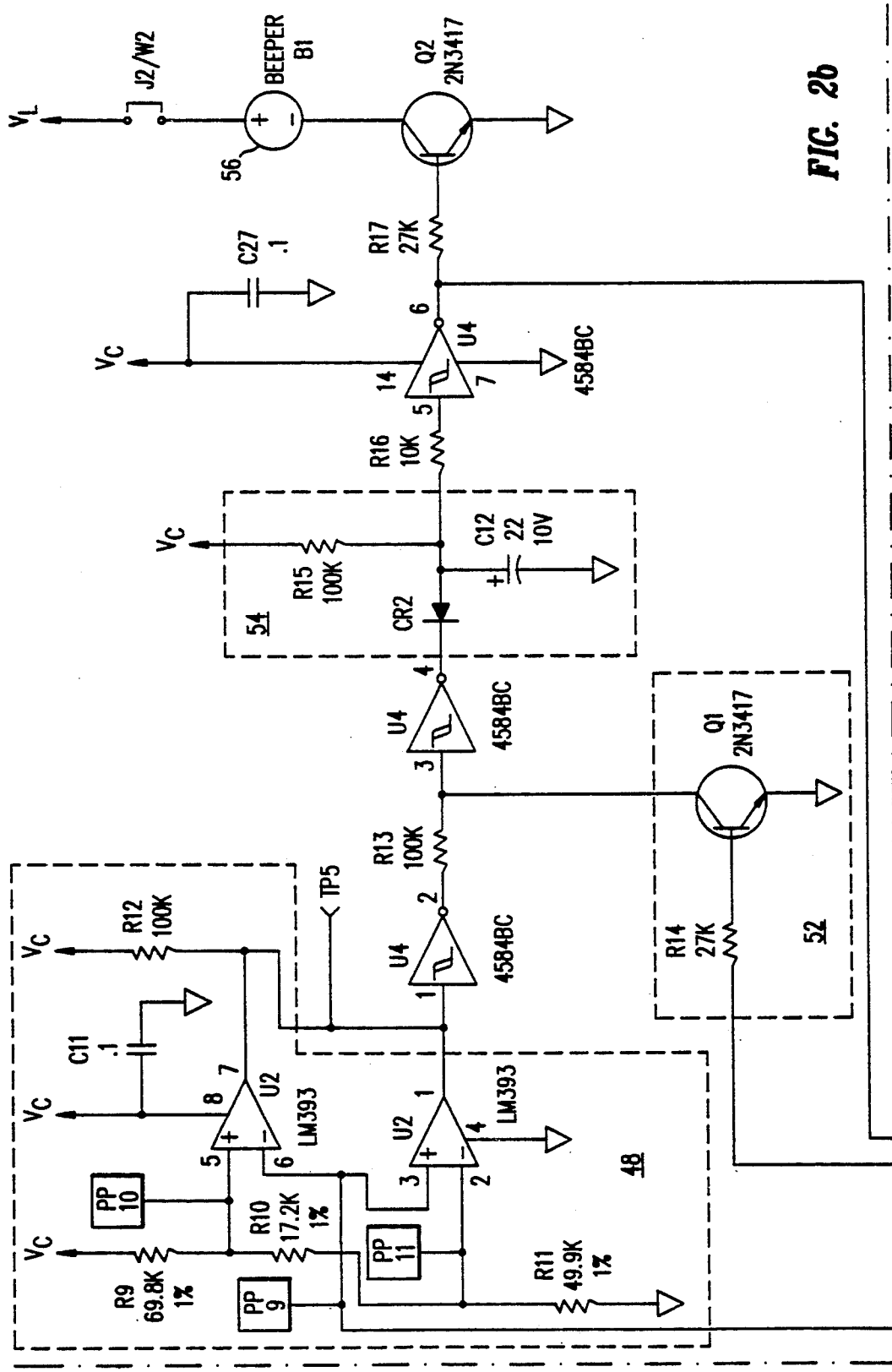
Figure 2C:
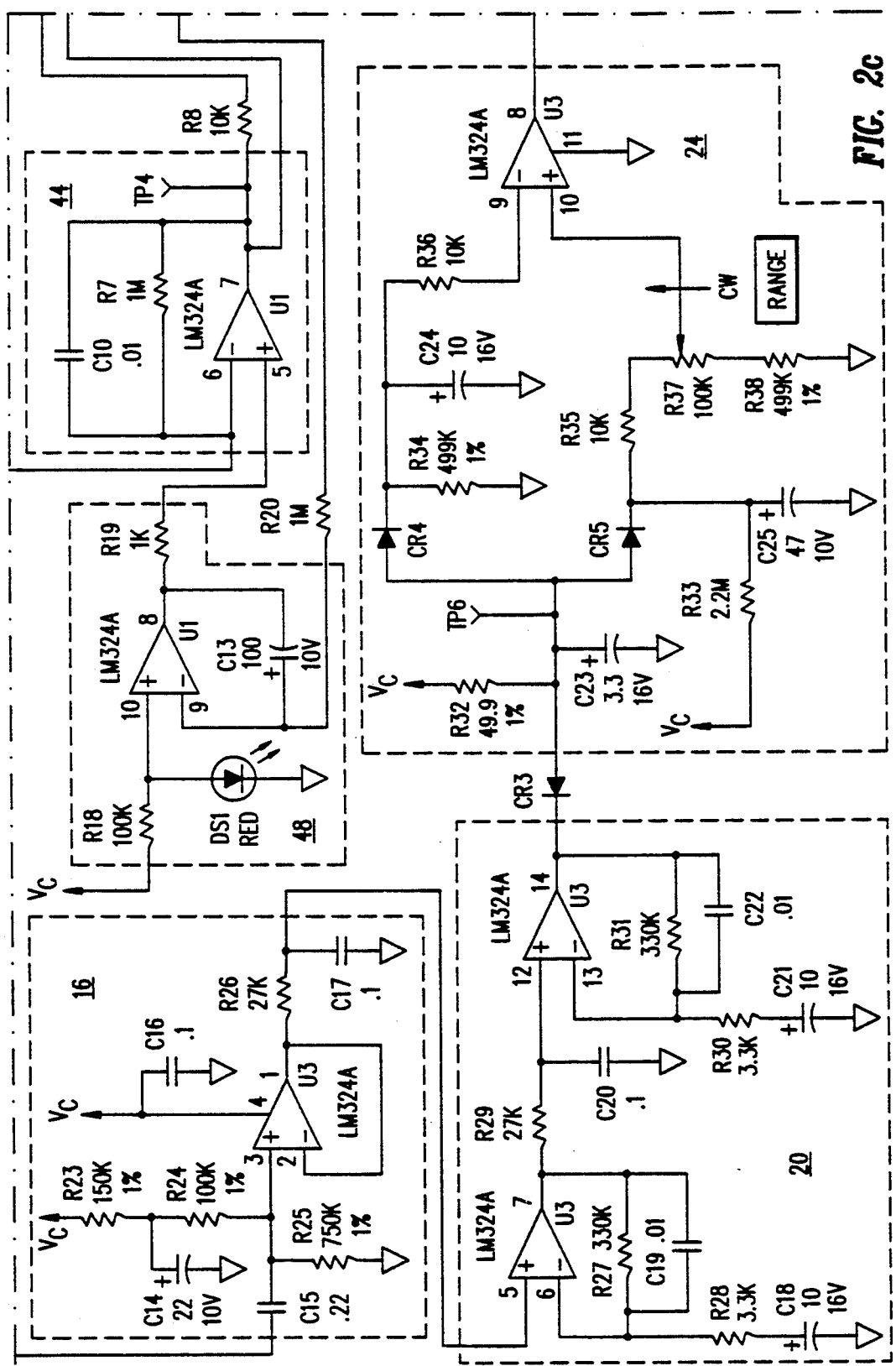
Figure 2D:
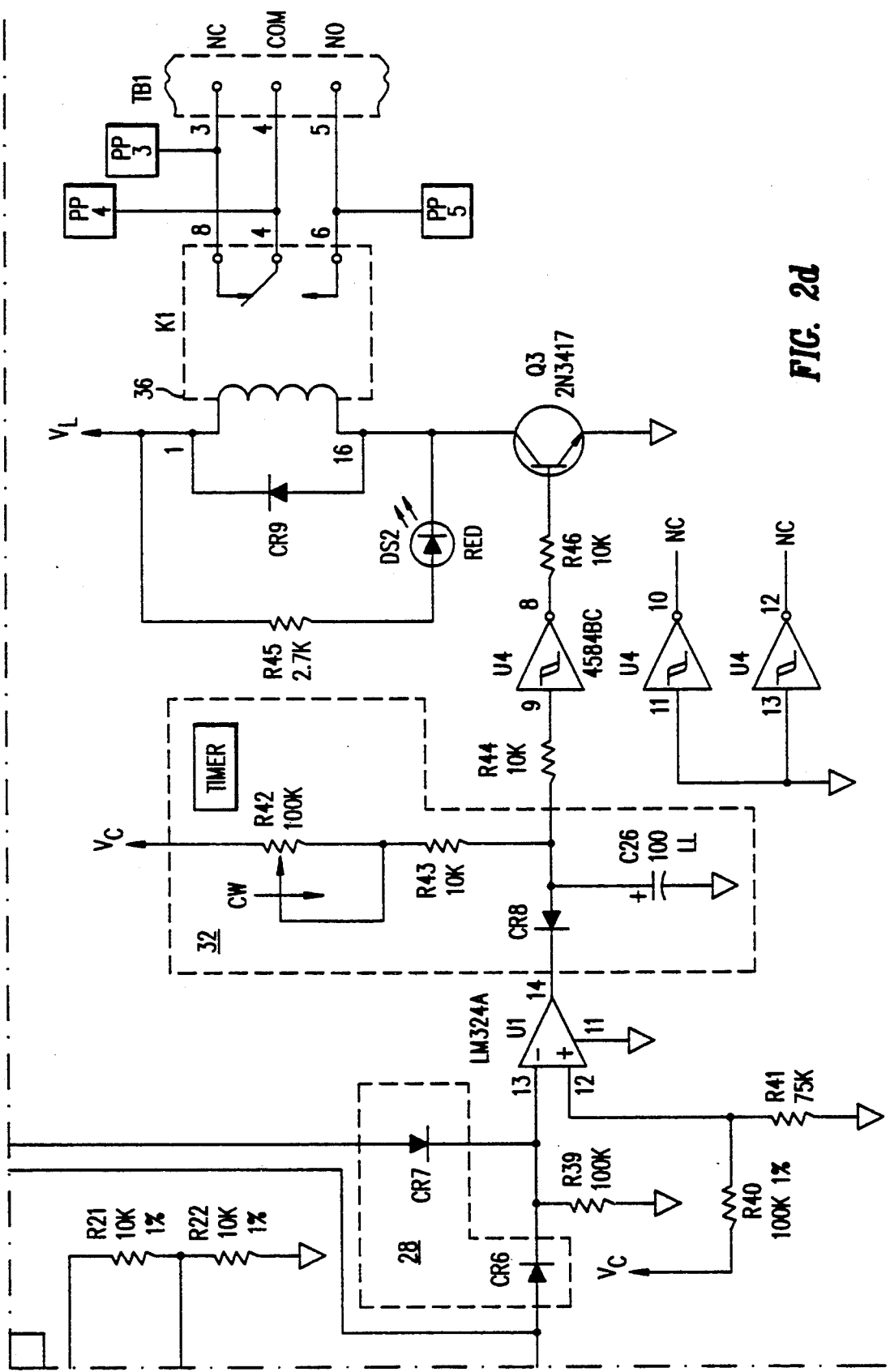

Referring to FIG. 1 there is shown a block level diagram of a sensor 10 of the present invention. The sensor 10 comprises a microwave transceiver 12 for generating microwave radiation directed towards a field of view and for receiving the microwave radiation reflected from the field of view. The transceiver 12 is well known in the art and generates a first signal 14 in response to the detection of microwave radiation reflected from the field of view. The first signal 14 is supplied to a band pass amplifier 16. The band pass amplifier 16 receives the first signal 14 and generates a first amplified signal 18. The band pass amplifier 16 amplifies the first signal 14 in the doppler shifted radiation portion of the received microwave radiation. Further, the band pass amplifier 16 has a gain which is on the order of 1.

The first amplified signal 18 is supplied to a filter 20. The filter 20 passes that portion of the first amplified signal 18 in the region of approximately 15 to 50 Hz. In addition, the filter 20 has an amplifier having a gain of 50,000. The filter 20 produces a first amplified filtered signal 22.

The first amplified filtered signal 22 is supplied to an adaptive threshold comparator 24. The adaptive threshold comparator compares the first amplified filtered signal 22 with a threshold signal. In the event the first amplified filtered signal 22 exceeds the threshold signal, then a first alarm signal 26 is generated by the adaptive threshold comparator 24. Thus far, the transceiver 12, the band pass amplifier 16, the filter 20, and the adaptive threshold comparator 24 are all well known in the art of microwave motion detectors. This portion of the sensor 10 will henceforth be referred to as the motion channel.

The first alarm signal 26 is supplied to an OR gate 28. In the event the first alarm signal 26 is high, the output of the OR gate 28, an actuation signal 30, would also be high. The actuation signal 30 is supplied to a timer 32. The timer 32 receives the actuation signal 30 and holds it for a predetermined period of time. In the preferred embodiment, this is approximately 1 to 5 seconds. The output of the timer 32 is a held actuation signal 34 which is supplied to a relay 36 which can be used to open a door or the like.

The first signal 14 from the transceiver 12 is also supplied to a low pass filter 40. The low pass filter 40 serves to filter the first signal 14 to produce a second filtered signal 42. The second filtered signal 42 has a frequency spectrum of much less than approximately 1.0 Hz. The second filtered signal 42 is supplied to a low pass differential amplifier 44. The low pass differential amplifier 44 generates a second amplified filtered signal 46 in response thereto. The second filtered amplified signal 46 is supplied in a feedback mode back to an integrator 48, at its negative input. The integrator 48 also receives a reference signal along its positive input. The output of the integrator 48 is supplied to the positive input of the low pass differential amplifier 44. In this manner, the D.C. reference of the low pass differential amplifier 44 can be set by the reference signal, which is a constant, instead of a reference from the transceiver 12, which can vary from part to part.

The second filtered amplified signal 46 is then supplied to a window comparator 48. The window comparator 48, is similar to the adaptive threshold comparative 24 in that if the second amplified filter signal 46 exceeds a threshold level, the window comparator 48 generates a second alarm signal 50. The second alarm signal 50 is supplied to a pulse stretch circuit 54 and to a beeper 56. From the pulse stretch circuit 54, the second alarm signal 50 is also supplied to the OR gate 28. This portion of the sensor 10 will henceforth be referred to as the presence channel.

In the event the first alarm signal 26 is generated, it is supplied to a doppler inhibit 52 which inhibits the generation of the second alarm signal 50.

The voltage supplied to the apparatus 10 is generated by a voltage supply 60 generating a voltage level of $V_c$. The voltage supply 60 receives a source of 24 volt RMS voltage. The 24 volt RMS voltage is supplied to a voltage pre-reg circuit 62. From the voltage pre-reg circuit 62, the voltage is supplied to a voltage post-reg circuit 64. The output of the voltage post-reg circuit 64 is a DC voltage $V_c$.

The operation of the sensor 10 of the present invention is as follows. As previously stated, the sensor 10 can be used to detect the passage of a person or an animal in a field of view to actuate a door or the like. Thus, the sensor 10 is mounted in close proximity to the threshold of a doorway and generates microwave radiation directed to a field of view which is proximate to the threshold of the doorway. The microwave transceiver 12 generates the microwave radiation and detects the reflected radiation. In the event a person or an animal passes in the field of view, the microwave transceiver 12 receives a reflected microwave radiation. The reflected microwave radiation has a doppler shifted component thereof. The received microwave radiation is generated as a first signal 14 which is supplied to the motion channel.

In the event the doppler shifted microwave radiation is in the range of approximately 15 Hz to approximately 50 Hz, which represents the motion of a person or an animal, approximately in the range of 0.5-3 miles per hour, typical walking rate of a person or an animal, the adaptor threshold comparator 24 will generate the first actuation signal 26. The first actuation signal 26 is supplied to the OR gate 28. The output of the OR gate 28 is supplied to the timer 32 which holds the signal for approximately 1 to 5 seconds. This held signal 34 is then used to actuate the relay 36 which opens the door. At the same time, the first actuation signal 26 is supplied to the doppler inhibit circuit 52 which inhibits the generation of the second actuation signal 50 by the presence channel. Therefore, so long as a person or an animal is detected by the motion channel, the presence channel is disengaged.

When the motion channel stops generating the first actuating signal 26, there are two possible causes. First, the person or animal has crossed the doorway threshold. Thus, the door may now be safely closed. The second possibility is that the person or animal is walking very slowly and is still at or near the doorway threshold. Either the movement of the person or animal is so slow that the motion channel is unable to detect it or the person or animal is outside of the field of view of the detection by the motion channel.

When the first actuation signal 26 goes low, indicating the disengagement of the motion channel, the doppler inhibit circuit 52 no longer inhibits the generation of the second actuation signal 50.

In the presence channel, the gain of its amplifier 44 is smaller than the gain of the amplifier in the band pass amplifier 16. Thus, the presence channel is directed to detect a person or an animal in a field of view which is much closer to the doorway threshold where the sensor 10 is mounted, than the field of view for the motion channel. Further, since the presence channel is adapted to detect "presence" or motion much less than 1.0 Hz (which is swaying motion), the presence channel is able to detect the presence of a person or an animal near the threshold of a doorway. In actuality, with 1 Hz sensitivity, a person or an animal is unlikely to hold absolutely still to avoid detection by the presence channel. Thus, if a person or an animal is in the doorway threshold or proximate thereto, the presence channel would then detect the presence of the person or animal in that field of view.

In the event the presence channel detects the presence of the person or the animal in the field of view proximate to the doorway threshold, the second actuation signal 50 is generated. As previously stated, since the doppler inhibit circuit 52 is no longer active, the second actuation signal 50 is supplied to the pulse stretch 54. The pulse stretch 54 stretches the second actuation signal 50 for approximately five (5) seconds. The output of the pulse signal 54 is supplied to the OR gate 28. If the second actuation signal 50 is present, then the door remains actuated in the open position to permit the passage of the person therethrough. With the pulse stretch 54, the door is maintained in the open position for a time period which is the sum of the pulse stretch 54 and the timer 32. Thus, a signal from the presence channel keeps the door opened a period of time longer than a signal from the motion channel.

There are many advantages to the sensor 10 of the present invention. First and foremost, the presence channel is constructed integrally with the motion channel in the same microwave motion detector. Secondly, by having the presence detector activated only in the event the motion channel is not activated, this means that unlike the prior art, the presence sensor is not always on. However, when the presence sensor is on and a person or animal is detected by the presence sensor, then the door opener is held for a period of time longer than that which is normally held open upon the detection by the motion channel. This means that if the person or animal is detected by the motion channel indicating that the person or animal is moving relatively fast, then the door does not need to be held for a long period of time. On the other hand, if the person or animal is detected by the presence detector, indicating that the person or animal is moving slowly, then the door will be held for a period of time longer than that held by the motion channel. In this manner, energy losses from within a building to the external environment can be minimized. At the same time, the safety consideration of having both a presence detector and a motion detector is combined in a single integral device. Finally, the presence channel is directed to a field of view which is greater than the field of view of an active infrared sensor of the prior art.

Referring to FIGS. 2a-2d there is shown a schematic circuit diagram of the sensor 10 of the present invention. The various schematic block diagram components shown in FIG. 1 are shown in FIGS. 2a-2d. In particular, the doppler inhibit circuit 52 is simply transistor Q1 2N3417. The OR gate 28 is simply the node interconnecting the wire from diode CR7 and CR6 supplying as input to LM324A. In all other aspects, the components shown in the schematic circuit diagram FIG. 2 are of conventional design.

What is claimed is:

1. A sensor for detecting the passage of a person or an animal in a field of view; said sensor comprising:
    means for detecting the motion of a said person or animal in said field of view, said detecting means generating a first signal in response to the detection of the motion of said person or animal in said field of view;
    means for sensing the presence of said person or animal in a portion of said field of view, and for generating a second signal in response thereto; said sensing means being inhibited in response to said first signal; and
    means responsive to said first or second signal, for generating an actuation signal for indicating the passage of said person or animal in said field of view.

2. The sensor of claim 1 wherein said detecting means comprises a microwave sensor.

3. The sensor of claim 2 wherein said sensing means comprises said microwave sensor detecting motion less than approximately 1 Hz.

4. A sensor for detecting the passage of a person or an animal in a field of view, said sensor comprising:
    first motion detecting means for detecting the motion of said person or animal in said field of view, said first detecting means generating a first signal in response to the detection of the motion of said person or animal, in said field of view at a first rate;
    second motion detecting means for detecting the motion of said person or animal in said field of view, said second detecting means generating a second signal in response to the detection of the motion of said person or animal, in a portion of said field of view at a second rate, slower than said first rate, said second detecting means being inhibited in response to said first signal; and
    means responsive to said first or second signal, for generating an actuation signal for indicating the passage of said person or animal in said field of view.

5. The sensor of claim 4 wherein said first motion detecting means is a doppler shift microwave detector detecting motion at approximately 15 to 50 Hz.

6. The sensor of claim 5 wherein said second motion detecting means is a microwave detector detecting motion less than approximately 1.0 Hz.

7. A sensor for detecting the passage of a person or an animal in a field of view, said sensor comprising:
    first microwave motion detecting means for detecting the motion, at a first rate, of said person or animal in said field of view, and for generating a first signal in response thereto;
    second microwave motion detecting means for detecting the motion, at a second rate, slower than said first rate, of said person or animal in a portion of said field of view, and for generating a second signal in response thereto;
    means, responsive to said first signal, for inhibiting said second microwave motion detecting means from generating said second signal; and
    means for receiving said first or second signals and for generating an actuation signal for indicating the passage of said person or animal in said field of view, in response thereto.

8. An apparatus for actuating a door or the like, in response to a person or animal in a field of view proximate to said door or the like moving to said door or the like, said apparatus comprising:
    means for generating microwave radiation directed at said field of view;
    means for receiving microwave radiation reflected from said field of view, and for generating a first signal in response thereto;
    first means for amplifying said first signal, said first amplifying means having a first gain and for generating an amplified first signal in response thereto;
    means for receiving said amplified first signal and for detecting a doppler phase shifted signal, representative of motion by said person or animal in said field of view, and for generating a first actuation signal;
    means for filtering said first signal and for generating a second filtered signal, having a frequency response of approximately less than 1.0 Hz;
    second means for amplifying said second filtered signal, said second amplifying means having a second gain less than said first gain; and for generating an amplified second signal in response thereto;
    means for receiving said amplified second signal and for generating a doppler phase shifted signal, representative of presence of said person or animal in said field of view and for generating a second actuating signal;
    means for receiving said first actuating signal and for inhibiting the generation of said second actuating signal in response thereto; and
    logic means for receiving said first and second actuating signals and for actuating said door or the like in response to either said first or said second actuation signal.

* * * * *